United States Patent
Bürvenich et al.

(10) Patent No.: US 8,150,544 B2
(45) Date of Patent: Apr. 3, 2012

(54) METHOD AND DEVICE FOR CONTROLLING AN INSTALLATION FOR PRODUCING STEEL

(75) Inventors: Hans-Peter Bürvenich, Erlangen (DE); Gerhard Dachtler, Baiersdorf (DE); Günter Sörgel, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 269 days.

(21) Appl. No.: 10/569,297

(22) PCT Filed: Jul. 26, 2004

(86) PCT No.: PCT/EP2004/008347
§ 371 (c)(1),
(2), (4) Date: Oct. 4, 2006

(87) PCT Pub. No.: WO2005/021811
PCT Pub. Date: Mar. 10, 2005

(65) Prior Publication Data
US 2007/0088524 A1    Apr. 19, 2007

(30) Foreign Application Priority Data
Aug. 27, 2003   (DE) .................................. 103 39 766

(51) Int. Cl.
G05B 13/02    (2006.01)
G05B 11/01    (2006.01)
G06F 19/00    (2011.01)

(52) U.S. Cl. .............. 700/145; 700/28; 700/45; 700/54; 700/71

(58) Field of Classification Search .............. 700/28, 700/44, 45, 54, 71, 171, 173; 164/4.1, 154.1, 164/449.1, 452; 366/8, 16
See application file for complete search history.

(56) References Cited

U.S. PATENT DOCUMENTS

| | | | | |
|---|---|---|---|---|
| 3,253,438 A | * | 5/1966 | Stringer | 72/8.5 |
| 3,358,743 A | * | 12/1967 | Adams | 164/450.2 |
| 3,478,808 A | * | 11/1969 | Adams | 164/454 |
| 3,574,279 A | * | 4/1971 | Smith, Jr. | 72/10.4 |
| 3,683,471 A | * | 8/1972 | Lemelson | 29/33 C |
| 4,368,509 A | * | 1/1983 | Li | 700/53 |
| 4,699,202 A | * | 10/1987 | Gilles | 164/455 |
| 4,951,734 A | * | 8/1990 | Hoffken et al. | 164/455 |
| 4,955,216 A | * | 9/1990 | Barker et al. | 72/13.4 |
| 5,136,497 A | * | 8/1992 | Coe et al. | 700/45 |

(Continued)

FOREIGN PATENT DOCUMENTS
CA    2 299 945 A1    3/2000

(Continued)

OTHER PUBLICATIONS
International Search Report; WO 2005/021811 A3; 8 Pgs, Mar. 10, 2005.

(Continued)

*Primary Examiner* — Albert Decady
*Assistant Examiner* — Jennifer L. Norton
(74) *Attorney, Agent, or Firm* — King & Spalding L.L.P.

(57) ABSTRACT

In a method for controlling an installation for producing steel having specific material properties, the material properties depend on the structure and can be influenced by operating parameters of the installation. The operating parameters are determined by a computing program for structure optimization, whereby the set values of the chemical composition of the steel are simultaneously determined by the computing program for structure optimization.

14 Claims, 3 Drawing Sheets

U.S. PATENT DOCUMENTS

| | | | | |
|---|---|---|---|---|
| 5,205,345 A * | 4/1993 | McClellan et al. | 164/452 |
| 5,357,443 A * | 10/1994 | Watanbe et al. | 700/147 |
| 5,379,237 A * | 1/1995 | Morgan et al. | 703/2 |
| 5,423,926 A * | 6/1995 | Sashihara et al. | 148/508 |
| 5,461,894 A * | 10/1995 | Sorgel | 72/9.2 |
| 5,499,188 A * | 3/1996 | Kline et al. | 700/106 |
| 5,502,992 A * | 4/1996 | Sorgel et al. | 72/9.1 |
| 5,778,151 A * | 7/1998 | Gramckow et al. | 706/20 |
| 5,854,749 A * | 12/1998 | Kellams et al. | 700/146 |
| 5,904,204 A * | 5/1999 | Teraoka et al. | 164/417 |
| 6,044,895 A * | 4/2000 | Kuttner et al. | 164/155.4 |
| 6,085,183 A * | 7/2000 | Horn et al. | 706/45 |
| 6,144,954 A * | 11/2000 | Li | 706/62 |
| 6,418,354 B1 * | 7/2002 | Brose et al. | 700/150 |
| 6,430,461 B1 * | 8/2002 | Andorfer et al. | 700/148 |
| 6,438,534 B1 * | 8/2002 | Sorgel | 706/61 |
| 6,546,310 B1 * | 4/2003 | Doll et al. | 700/150 |
| 6,581,672 B2 * | 6/2003 | Strezov et al. | 164/452 |
| 6,718,234 B1 * | 4/2004 | Demoro et al. | 700/269 |
| 6,796,147 B2 * | 9/2004 | Borysowicz et al. | 65/162 |
| 6,842,656 B1 * | 1/2005 | Burkhardt et al. | 700/110 |
| 6,896,034 B2 * | 5/2005 | Strezov et al. | 164/452 |
| 7,354,492 B2 * | 4/2008 | Rashnikov et al. | 148/509 |
| 7,440,807 B2 * | 10/2008 | Kanaoka et al. | 700/45 |
| 7,463,940 B2 * | 12/2008 | Tanartkit et al. | 700/100 |
| 7,546,170 B2 * | 6/2009 | Ayala et al. | 700/45 |
| 2003/0114940 A1 * | 6/2003 | Brose et al. | 700/30 |
| 2005/0004684 A1 * | 1/2005 | Cribbs | 700/31 |

FOREIGN PATENT DOCUMENTS

| | | |
|---|---|---|
| DE | 196 37 917 A1 | 3/1998 |
| DE | 198 06 267 A1 | 5/1999 |
| DE | 198 50 492 A1 | 5/1999 |
| EP | 0 901 016 A2 | 3/1999 |
| JP | 01075646 A | 3/1989 |
| WO | WO 99/24182 | 5/1999 |

OTHER PUBLICATIONS

International Written Opinion; PCT/EP2004/008347; 5 Pgs, 2005.

* cited by examiner

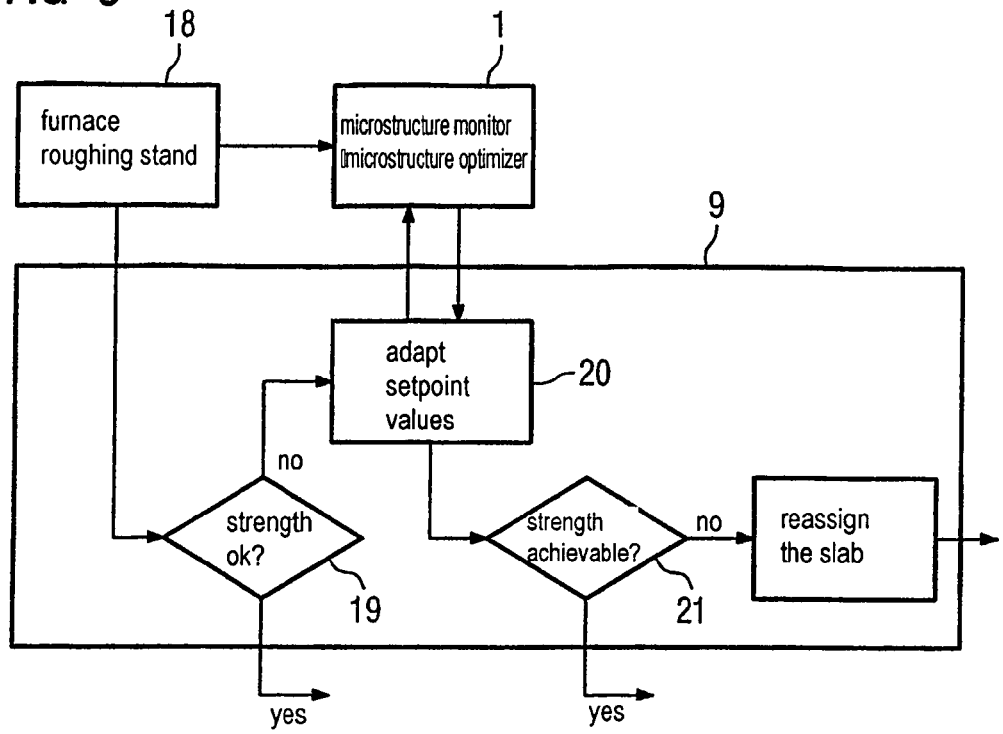
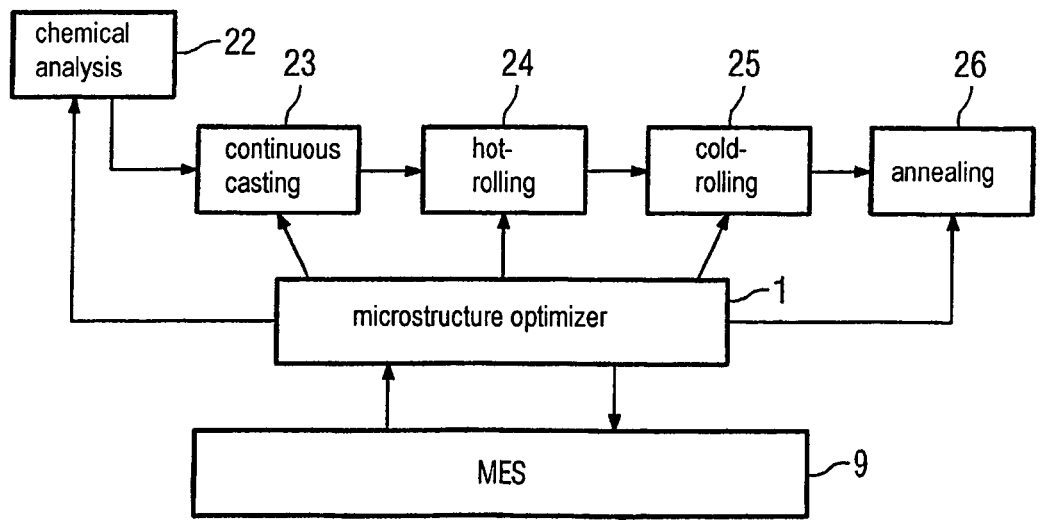

METHOD AND DEVICE FOR CONTROLLING AN INSTALLATION FOR PRODUCING STEEL

CROSS-REFERENCE TO RELATED APPLICATIONS

This application is a U.S. national stage application of International Application No. PCT/EP2004/008347 filed Jul. 26, 2004, which designates the United States of America, and claims priority to German application number DE 103 39 766.3 filed Aug. 27, 2003, the contents of which are hereby incorporated by reference in their entirety.

TECHNICAL FIELD

The invention relates to a method for controlling an installation for the production of steel which has defined materials properties that are dependent on the microstructure and can be influenced by operating parameters of the installation, which operating parameters are defined by means of a computation program for microstructure optimization.

BACKGROUND

Steel has to be produced with the materials properties requested by the customer. Important materials properties of steel include, for example, the tensile strength, the yield strength and the elongation at break. These materials properties play an important role if the steel is intended for deep-drawing, for example for the production of automobile body panels or drinks cans.

The materials properties of the steel result from its microstructure, which is turn influenced and defined by the production guidelines for the production process.

During production, it is necessary to ensure that the chemical composition of the steel corresponds to the respective setpoint values. These setpoint values correspond to quantitative fractions which can be checked by a chemical laboratory analysis.

To produce a steel which complies with the stipulations, it is also necessary to maintain defined operating parameters. These operating parameters include setpoint values for the melting, casting, heating, rolling and cooling phase. They may, for example, be temperatures, pressures, velocities or changes of these parameters over the course of time.

A setpoint value for a defined quantitative fraction for an element or a setpoint value for an operating parameter always comprises a target value and a lower limit value and an upper limit value, between which the tolerance range lies.

In steelworks or rolling mills, it is often difficult to define suitable setpoint values for production in such a way that the desired materials properties in the end product are produced under production conditions that are as low-cost as possible and involve the minimum possible risk. The demands of the customer, who for example orders a standardized steel grade for a specific application area, have to be implemented taking into the production processes used in the steelworks. These production processes include the works standards for the steel grade and also the target values and tolerance ranges for the individual production steps.

In practice, however, the actual values from production always deviate from the setpoint values for the production process. The deviations in the actual values in a production step have to be counteracted in the subsequent steps in such a way that the required materials properties, for example the minimum value for the tensile strain, are achieved. If this value can no longer be achieved, the corresponding steel material (the melt, slab or coil) can no longer be used for the intended order. In this case, the processing of this part of the order has to be restarted at the first production step, which leads to financial losses and possibly also to delivery delays.

The defining of suitable setpoint values for production is usually carried out by a planning department as part of technical order planning. The operator makes use of various technical tables, which are stored in a data processing installation, to convert the customer's order into a suitable production process for the plant, this production process being linked to defined setpoint values.

For the steel, the quantitative fractions of the individual elements are defined and can be checked by a chemical laboratory analysis. This set of setpoint values is also referred to as the steel grade. The setpoint values for the operating parameters of the individual production steps are also defined. In the steelworks, the melt is produced and the slabs are cast from this melt. In the furnace, the slabs are heated for the rolling operation. In the hot-rolling mill, the slabs are rolled to form coils, and if appropriate further rolling is carried out in a cold-rolling mill, and/or qualitative heat treatment of the coils and if appropriate division into smaller formats are carried out.

The situation often arises whereby a certain order can be produced by a plurality of alternative sets of setpoint values which result from the tables. To achieve the desired properties, the operator has to decide on one of these possible sets of setpoint values, since the production order to the production department only permits one set of setpoint values. The operator decides on a defined set of setpoint values based on his production experience. The entire know-how of the company relating to production operations is held within these technical tables, which are looked after by the quality division. New entries and changes in these tables result from long years of production experience and from test productions using sets of setpoint values which have been altered in steps.

In recent years, mathematical methods have been developed for calculating the materials properties of steel. These methods include a physico-metallurgical model of the production process and determine the changes in the microstructure of the steel for each production step and then calculate the materials properties from this information.

Individual production steps can be simulated on the computer in this way. For standard steel grades, it has been ascertained that the materials properties which are calculated are well matched to the values which are actually measured.

EP 0 901 016 A2 has disclosed a mathematical method for determining properties of a steel. Typical variables, such as yield strength, tensile strength, elongation at break, hardness, etc. are supposed to be determined by means of a neural network.

WO 99/24182 has disclosed a method for controlling a metallurgical installation for the production of steel or aluminum, in which steel is produced with defined materials properties that are dependent on the microstructure, the materials properties being dependent on operating parameters with which the installation is operated. The operating parameters are supposed to be defined by means of a microstructure optimizer as a function of the desired materials properties of the steel. The microstructure optimizer is a computation program for microstructure optimization which makes use of neural networks.

However, a drawback is that the production planning is often unable to produce a successful production program, i.e. an appropriate sequence, since it is restricted to one set of setpoint values per production order. One such example is melt planning, which has to combine a large number of production orders with different steel grades and dimensions in the form of melts and sequences, i.e. technically compatible sequences of melts. Only orders of one steel grade can be processed in one melt, and only melts with compatible steel grades can follow one another in one sequence. The stock of orders often comprises a large number of qualitatively similar orders of small quantities which, however, have different steel grades. This situation often leads to poor production programs, since the number of possible melts in the program is small and the individual melts often have to be filled with what are known as store orders, since there is an absence of customer orders for suitable qualities.

Another drawback is that the quality department has to spend considerable money and time on optimizing sets of setpoint values with regard to the demands on the materials properties and with regard to production costs. The large number of production tests required, with modified sets of setpoint values, and the testing of the materials properties using laboratory specimens which in each case ensues, lead to high levels of outlay. Therefore, many sets of setpoint values are compromised in terms of reliability with regard to the desired target values and tolerance ranges since they have had to be derived from an inadequate number of production tests. Larger tolerance ranges and more cost-effective target values for certain materials properties can only be implemented after a steel grade has been produced for a number of years.

In principle, the control systems of the individual production units attempt to maintain their setpoint values for the output variables even if the input values, i.e. the actual values from the preceding step, deviate. If a slab arrives at the rolling train from the furnace at a temperature which is too cold, the control system of the rolling train nevertheless attempts to reach its setpoint value for the output temperature of the rolled strip by suitably changing the control variables of the control system. This only works for setpoint values which can still be influenced, for example incorrect temperatures or dimensions which can be changed to a certain extent. However, it is not possible for a steel with an incorrect chemical analysis, i.e. with incorrect quantitative fractions of the alloying elements, to be altered in the subsequent rolling mill.

If the deviations cannot be tolerated, for example because individual elements in the chemical analysis infringe the limit values, the current intermediate product is given up for this order. Production planning then has to produce further material with a high priority, but this leads to time delays. The current intermediate material is either switched to other suitable orders, i.e. reassigned, or is if necessary switched to store orders without any associated customer request, or is removed from production and placed in an intermediate store. The final option is for the material to be designated scrap and return to the resource circuit.

SUMMARY

Therefore, the invention is based on the problem of providing a method for controlling an installation for producing steel which can plan orders more flexibly and can react more flexibly to deviations from the setpoint values.

To solve this problem, it is provided, in a method of the type described in the introduction, that at the same time the setpoint values for the chemical composition of the steel are defined by means of the computation program for microstructure optimization.

Unlike in known methods, the computation program for microstructure optimization defines not only the operating parameters, which have an influence on the materials properties, but also at the same time the setpoint values for the chemical composition of the steel. The term "at the same time" also encompasses methods in which, for example, in a first computation operation the setpoint values for the chemical composition are determined, and then in a second computation operation the operating parameters are determined, or vice versa. The individual computation operations can take place in succession, but the setpoint values for the chemical composition and the operating parameters are always taken into account. Accordingly, the solution has significantly more degrees of freedom available to it, since for each order it is not just a single, predefined set of setpoint values which can be used, but rather a plurality of sets of setpoint values. It was not hitherto possible to correct a set of setpoint values, since the operator of a production unit was not able to determine or stipulate the necessary effects on the downstream production steps. However, the computation program for microstructure optimization makes it possible for the required adjustments to setpoint values for subsequent production steps to be calculated on-line from the previous production results, taking account of the required materials properties.

The invention is based on the discovery that when defining the setpoint values, not only the individual production step, but rather the entire possible solution range for variations in setpoint values can be taken into account in order to achieve the required materials properties. This solution range with setpoint values which are dependent on one another even across production steps contains many more degrees of freedom and accordingly many more possible solutions than have hitherto been used.

As a result of the computation program for microstructure optimization being used to define the setpoint values for the chemical composition of the steel and the operating parameters at the same time, production planning can be made significantly more flexible. Moreover, continuous on-line quality control can be carried out during the individual production steps. This improved production planning allows all possible variations in the setpoint values to be included in the calculation, so that better production programs can be produced from the available stock of orders, i.e. longer sequences of melts and fewer filler orders in the melts.

The method according to the invention ensures that during production deviations in individual actual values from the setpoint values are compensated for by calculating the changes required to subsequent setpoint values, so that even deviations which have not hitherto been tolerable can now be tolerated. Consequently, the method according to the invention means that the tolerance ranges for the quantitative fractions of the elements contained in the steel can be widened.

It is expedient if the setpoint values for the chemical composition and if appropriate correspondingly calculated operating parameters for a defined steel application are in each case combined in a data record. As a result of an optimization calculation, a data record for a specific steel application is selected by the computation program and output as a result of an optimum combination of data records for the respective steel application of the orders to be planned being selected during production planning.

In the method according to the invention, it can be provided that the actual values for the chemical composition of the steel and the actual values for the operating parameters are compared with the setpoint values, and if deviations are present the computation program for microstructure optimization is run through again. The result of this calculation can result in the selection of a different set of setpoint values which is better matched to the actual values. As a result, the number of possible combinations is considerably increased, and in the event of a deviation between actual values and setpoint values, the steel product can still be used with a high degree of probability for the intended purpose, as a result of the further production steps being carried out with a modified set of setpoint values.

According to one configuration of the method according to the invention, it can be provided that a setpoint value is assigned a tolerance range, which lies between an upper limit and a lower limit, and the computation program for microstructure optimization is run through again in order to define setpoint values for the chemical composition of the steel and/or for the operating parameters in the event of values which lie outside the tolerance range.

It can be provided that the computation program for microstructure optimization optimizes the setpoint values with a view to one or more optimization variables. It may be expedient for the optimization calculations to be carried out with a view to minimizing materials costs and/or production costs. By way of example, it is possible to save on certain expensive alloying elements by carrying out certain treatment steps at altered temperatures.

A particular advantage of the method according to the invention is that during and/or after a production step, a quality check is carried out by comparing the setpoint values with the actual values by means of the computation program for microstructure optimization. As a result, it is possible to dispense with relatively slow and expensive laboratory tests, the validity of which is however only limited in many cases. The computation program for microstructure optimization continuously checks all the steel products, such as melt, slab or coil, in terms of their materials properties and compliance with the setpoint values, so that true material tests, for example in the form of tensile tests, can be reduced to occasional quality control tests.

In a hot-rolling mill, it is recommended for the quality check to be carried out at various points during the production sequence. The linking of the slabs to the production order in the slab yard, the exit of the heating furnace, the exit of the roughing stand and the exit of the coiler at the end of the production line are particularly suitable for this purpose. At each checkpoint, the computation program for microstructure optimization calculates the expected materials properties from the actual values from production which are known by that stage and the subsequent process with the associated setpoint values. If the required materials properties cannot be achieved in the subsequent steps with the current setpoint values, the microstructure optimizer automatically attempts to adapt the setpoint values. If the calculation gives a positive result, the quality check enables the adjustment of the setpoint values. If the calculation does not give a result, the quality check, with the aid of the computation program for microstructure optimization, searches the setpoint value lists of the stock of orders for an inexpensive, appropriate set of setpoint values and switches the intermediate material to this order. As a result, new setpoint values are also defined for the subsequent production steps.

It is possible to provide that the method according to the invention be coupled to the production planning of the installation for steel production. The production planning and the quality check are modules of the production control system (manufacturing execution system). Accordingly, the method according to the invention can also be directly coupled to the production control system of the installation for steel production.

The invention also relates to a device for carrying out the method described for controlling an installation for producing steel. According to the invention, it is provided that the computation program for microstructure optimization is designed to define the setpoint values for the chemical composition of the steel and the associated operating parameters at the same time.

BRIEF DESCRIPTION OF THE DRAWINGS

Further advantages and details of the invention will emerge from the exemplary embodiment described below and with reference to the drawings in which:

FIG. 5 shows the execution of the quality check during production; and

FIG. 6 shows the determination of optimum setpoint values for the entire production path.

DETAILED DESCRIPTION

Figure 1:
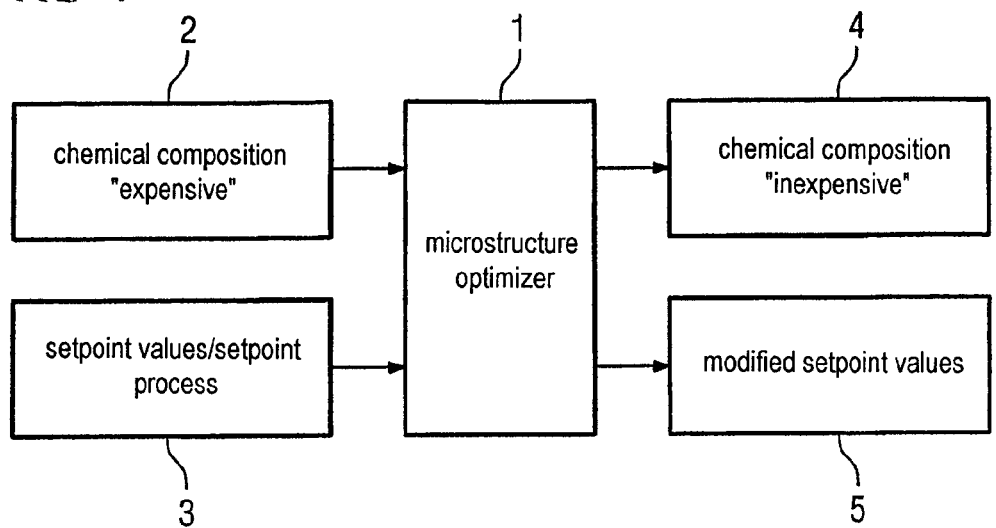
FIG. 1 diagrammatically depicts the way in which the microstructure optimizer operates.

FIG. 1 diagrammatically depicts the way in which the microstructure optimizer operates for optimizing alloying costs. The computation program for microstructure optimization, referred to below as microstructure optimizer 1, receives setpoint values 2 for the chemical composition and setpoint values 3 for the operating parameters of the desired process. The setpoint values 2, 3 together result in what is known as a steel grade, which is based on experience and takes into account all the information required for production of the respective order. The materials properties of the steel produced can be influenced by operating parameters of the installation, including treatment temperatures and pressures, and if appropriate also the time derivatives thereof. Mathematical models, which simulate the behavior of the material and determine the changes in the microstructure of the steel for each production step, are implemented in the microstructure optimizer 1. The microstructure optimizer 1 can also operate using the neural network method. As a result, the microstructure optimizer 1, after the execution of optimization calculations, delivers modified setpoint values 4 for the chemical composition of the steel, which allow production costs to be reduced compared to the setpoint values 2. By way of example, it is possible to aim to reduce the levels of relatively expensive alloying materials, such as niobium, manganese or titanium, without any deterioration in the materials properties. Modified setpoint values 5 for the production processes are coupled to the modified setpoint values for the chemical composition. The setpoint values 4, 5 together form a set of setpoint values which forms the basis for production.

Figure 2:
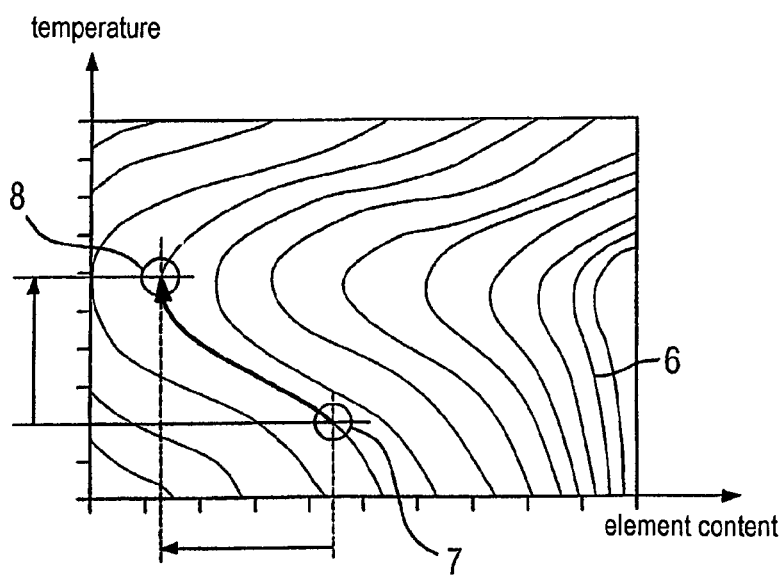
FIG. 2 shows the change in the mechanical properties of a steel as a function of the temperature and the element content.

FIG. 2 shows the change in the mechanical properties of an element as a function of the temperature and the element content.

The microstructure optimizer 1 is intended to optimize, i.e. minimize, production costs. One of the ways of reducing costs consists in reducing the element content of a specific chemical element, in particular an alloying element. The element content of a specific element is plotted on the horizontal axis in FIG. 2. The temperature is plotted on the vertical axis. The lines 6 shown in FIG. 2 indicate combinations of the element content and the temperature having the same mechanical property. A specific steel has hitherto been produced using the element content indicated by point 7. However, it is known that the property shown in FIG. 2, which may for example be the strength, remains constant if point 7 is shifted in the direction of the arrow toward point 8. In practice, this means that the content of the respective alloying element can be reduced, while at the same time the setpoint value for the temperature for a specific production step has to be increased. Reducing the quantitative fractions of this element results in a reduction in the costs, while the mechanical properties of the steel remain the same.

Figure 3:
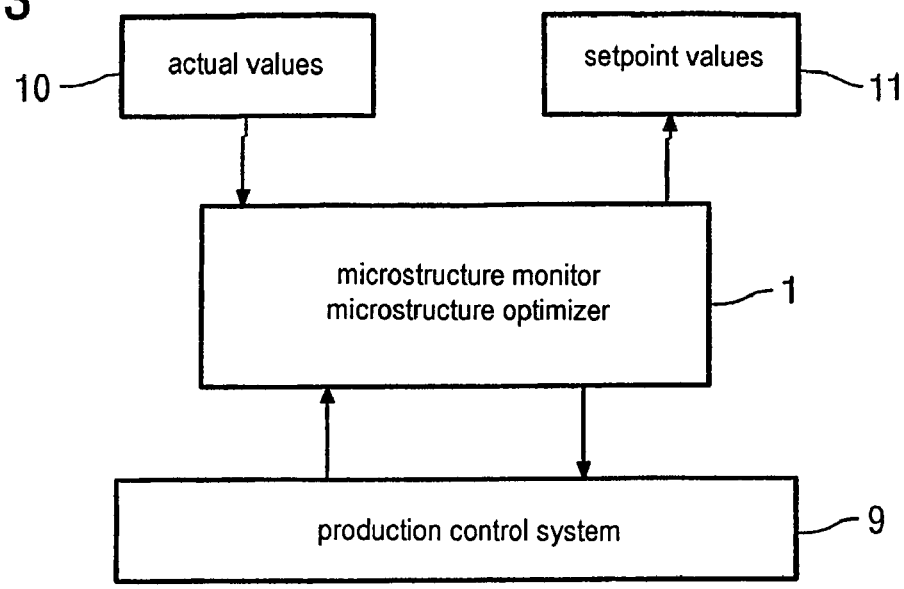
FIG. 3 shows the interaction of the microstructure optimizer with a production control system.

FIG. 3 shows the interaction of the microstructure optimizer 1 with a production control system. The production control system 9, also known as the manufacturing execution system (MES), comprises, inter alia, the production planning and the quality check. The microstructure monitor is a calculation module which calculates materials properties, such as the strength or yield strength, on the basis of input data. As a result, time-consuming laboratory tests can be substantially replaced. If it is established, after execution of a calculation by the microstructure monitor, that a mechanical property cannot be complied with, the microstructure optimizer 1 analyzes whether the steel product in question, by changing the setpoint values, can still be treated in such a way that it lies within the appropriate tolerances. The actual values 10, which are input variables for the microstructure monitor or the microstructure optimizer 1, comprise the quantitative fractions of the individual chemical elements, process temperatures, etc. Setpoint values 11 output are operating parameters and process parameters which form the basis for the further production steps.

The coupling of the microstructure optimizer 1 with the level of the production control system 9 allows costs to be reduced, since optimized steel grades are used for production. Time can be saved during the quality checking of coils, since the microstructure monitor substantially replaces laboratory tests. Nevertheless, materials properties are calculated for each coil, so that the probability of defects is reduced. A further advantage is that there are more degrees of freedom available for production planning. Hitherto, there has been a single standardized steel grade with predetermined setpoint values for rolling and cooling for each order. By contrast, with the method according to the invention, there are a number of presets available per order which each satisfy the required materials properties. Each preset comprises the works standard, which indicates the steel grade including the setpoint values for rolling and cooling. From the plurality of presets, the microstructure optimizer 1 can calculate and select the one which entails the lowest production costs.

The order planning supplies melt planning with a list of alternative works standards that can achieve the materials properties and, in addition, suitable setpoint values calculated by means of the microstructure optimizer, for each order. This results in very many more degrees of freedom for the planning of the melts. It is possible to form larger sequences and the number of steel grade changes is reduced. It is also possible to reduce the number of filler orders in the melts. The production can be carried out using a smaller number of steel grades by virtue of order-specific properties being compensated for by calculated rolling and cooling conditions. Order planning supplies melt planning with more orders using the same grade of steel in order to achieve better production programs. The microstructure optimizer calculates suitable setpoint values for the order-specific materials properties.

Figure 4:
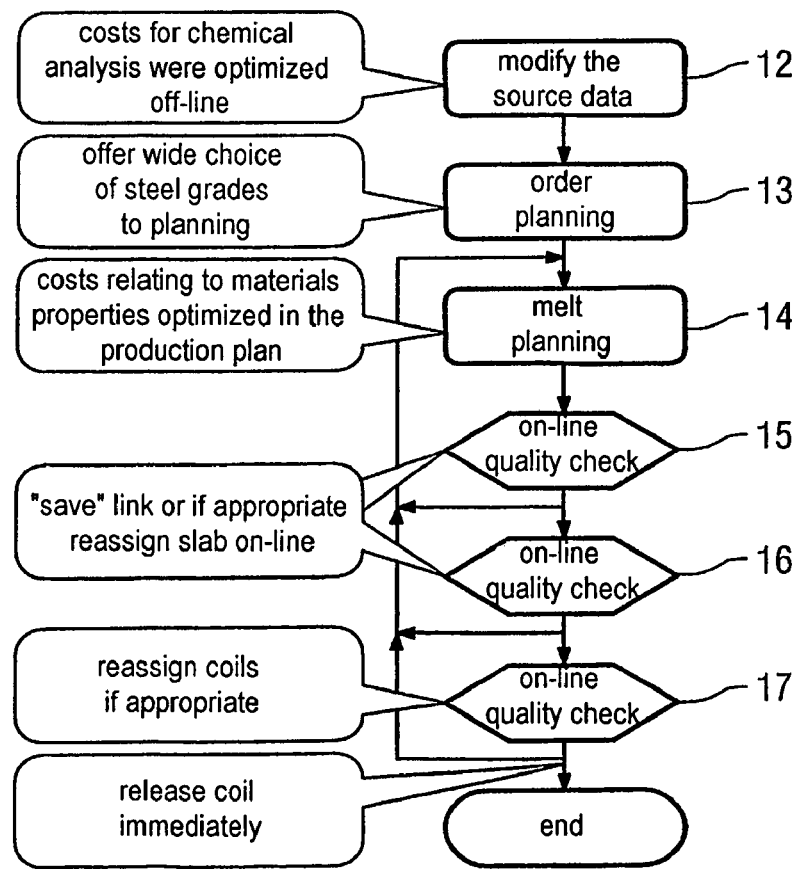
FIG. 4 shows a flow chart illustrating the individual method steps.

FIG. 4 shows a flow chart illustrating the individual method steps based on the example of a hot-rolling mill.

Prior to the beginning of production, the costs relating to the chemical analysis are optimized off-line. The result of this optimization can be utilized in method step 12 in order to modify the source data for the production control system. Order planning 13 can offer melt planning a wide range of steel grades for planning for each order. In the production plan, melt planning optimizes the costs with regard to the materials properties. An on-line quality check 15 is carried out, in which the linking of a slab to an order is either saved or the slab is reassigned on-line. A further on-line quality check 16 is carried out following the heating in the furnace or the rolling in the roughing stand. After a further on-line quality check 17 downstream of the coiler, the coil can be released immediately, thereby terminating the method.

FIG. 5 shows the execution of the quality check during the production.

The current process data pass from the furnace or the roughing stand 18 to the production control system (MES) 9. In step 19, it is checked whether the required materials properties can be achieved. If the result is "yes", production is continued with the existing setpoint values. If the result is "no", the setpoint values for the order have to be adapted in step 20. For this purpose, the production control system 9 interacts with the microstructure monitor and microstructure optimizer 1 and receives modified setpoint values. On the basis of the modified setpoint values, method step 21 checks whether the strength can be achieved using the modified setpoint values. If the strength can be achieved, production is continued using the modified setpoint values. If the strength cannot be achieved, a reassignment request is output in order to link the slab to a different order. The number of reassignments is reduced, and the modification to the setpoint values in many cases allows the slab to be saved for the existing order. The slabs or coils which are not suitable for the existing order are immediately reassigned without further production steps being carried out.

FIG. 6 shows, in a diagram, the determination of optimum setpoint values for the entire production sequence.

The method determines optimum setpoint values for the entire production sequence, with the individual operations and treatment steps of the manufacturing sequence being modeled and simulated by computation. The basis for the optimization calculation is the chemical analysis 22, the results of which form input variables for the continuous-casting 23. This is followed by hot-rolling 24 and cold-rolling 25. To improve the microstructure, the cold-rolling is followed by an annealing operation 26. All the individual treatment steps are input into the mathematical models of the microstructure optimizer 1, so that the latter can determine optimum setpoint values taking account of the entire production sequence. The microstructure optimizer 1 is in turn linked to the production control system (MES) 9, and accordingly the production can be controlled as a function of the results of the microstructure optimizer 1. Overall, the method allows considerable energy and materials costs to be saved. In addition, expert knowledge is built up about the overall process.

The invention claimed is:

1. A method for controlling an installation for producing steel, the steel having a microstructure and defined materials properties that are dependent on the microstructure and the defined materials properties can be influenced by operating parameters of the installation, the method comprising:

prior to beginning a production process, entering into a computation program for microstructure optimization both (a) setpoint values defining operating parameters of the desired production process and (b) setpoint values for a desired chemical composition of the steel that define desired quantitative fractions for one or more chemical elements;

the computation program for microstructure optimization:
  analyzing the entered setpoint values and predetermined dependencies between particular operating parameters and quantitative fractions for particular chemical elements, including analyzing data of a predetermined relationship between a quantitative content of a particular chemical element and a quantitative measure of at least one operating parameter used in one or more production steps of the steel production process, the data indicating modifications to the quantitative measure of the at least one operating parameter required to account for modifications to the quantitative content of the particular chemical element in order to provide a particular desired material property of the steel; and
  based on the analysis of the entered setpoint values and the predetermined dependencies between particular operating parameters and quantitative fractions for particular chemical elements, automatically modifying at the same time both (a) at least one of the setpoint values defining the quantitative fraction for at least one chemical element of the desired chemical composition of the steel and (b) at least one of the setpoint values defining operating parameters of the desired production process; and
  wherein, as a result of modeling the setpoint values for the desired chemical composition of the steel and for the operating parameters at the same time, at least the component material cost of the steel is reduced without reducing the material properties of the steel.

2. A method according to claim 1, wherein the setpoint values for the chemical composition and, if appropriate, correspondingly calculated operating parameters for a defined steel application are in each case combined in a data record.

3. A method according to claim 2, wherein the computation program for microstructure optimization, during production planning, selects an optimum combination of data records for a respective steel application of orders to be planned.

4. A method according to claim 1, wherein actual values for the chemical composition of the steel and actual values for the operating parameters are compared with the setpoint values, and if deviations are present the computation program for microstructure optimization is run through again.

5. A method according to claim 4, wherein a setpoint value is assigned a tolerance range, which lies between an upper limit and a lower limit, and the computation program for microstructure optimization is run through again in order to define setpoint values for the chemical composition of the steel and/or for the operating parameters in an event of values which lie outside the tolerance range.

6. A method according to claim 1, wherein the computation program for microstructure optimization defines the setpoint values with an objective of minimizing both materials costs and production costs.

7. A method according to claim 1, wherein during and/or after a production step, a quality check is carried out by comparing the setpoint values with actual values by means of the computation program for microstructure optimization.

8. A method according to claim 7, wherein the quality check is carried out in a hot-rolling mill during linking of slabs to a production order in a slab yard and/or at an exit of a heating furnace and/or at an exit of a roughing stand and/or of a coiler at an end of a production line.

9. A method according to claim 1, wherein the computation program for microstructure optimization checks whether the defined materials properties can be achieved with current setpoint values in subsequent production steps.

10. A method according to claim 9, wherein the computation program adapts the setpoint values if the defined materials properties in subsequent production steps cannot be achieved with the setpoint values.

11. A method according to, claim 1, wherein the method is coupled to a production planning of the steel production installation.

12. A method according to claim 1, wherein the method is coupled to a production control system of the steel production installation.

13. A method according to claim 1, wherein a number of steel grades in a plant is reduced by calculated variations in the operating parameters when defining a steel grade for an order.

14. A method according to claim 1, wherein tolerance ranges for chemical elements in steel grades are increased by varying the operating parameters.

* * * * *